Inventor
Russell Hastings Jr.
by Heard Smith Tennant
Atty's.

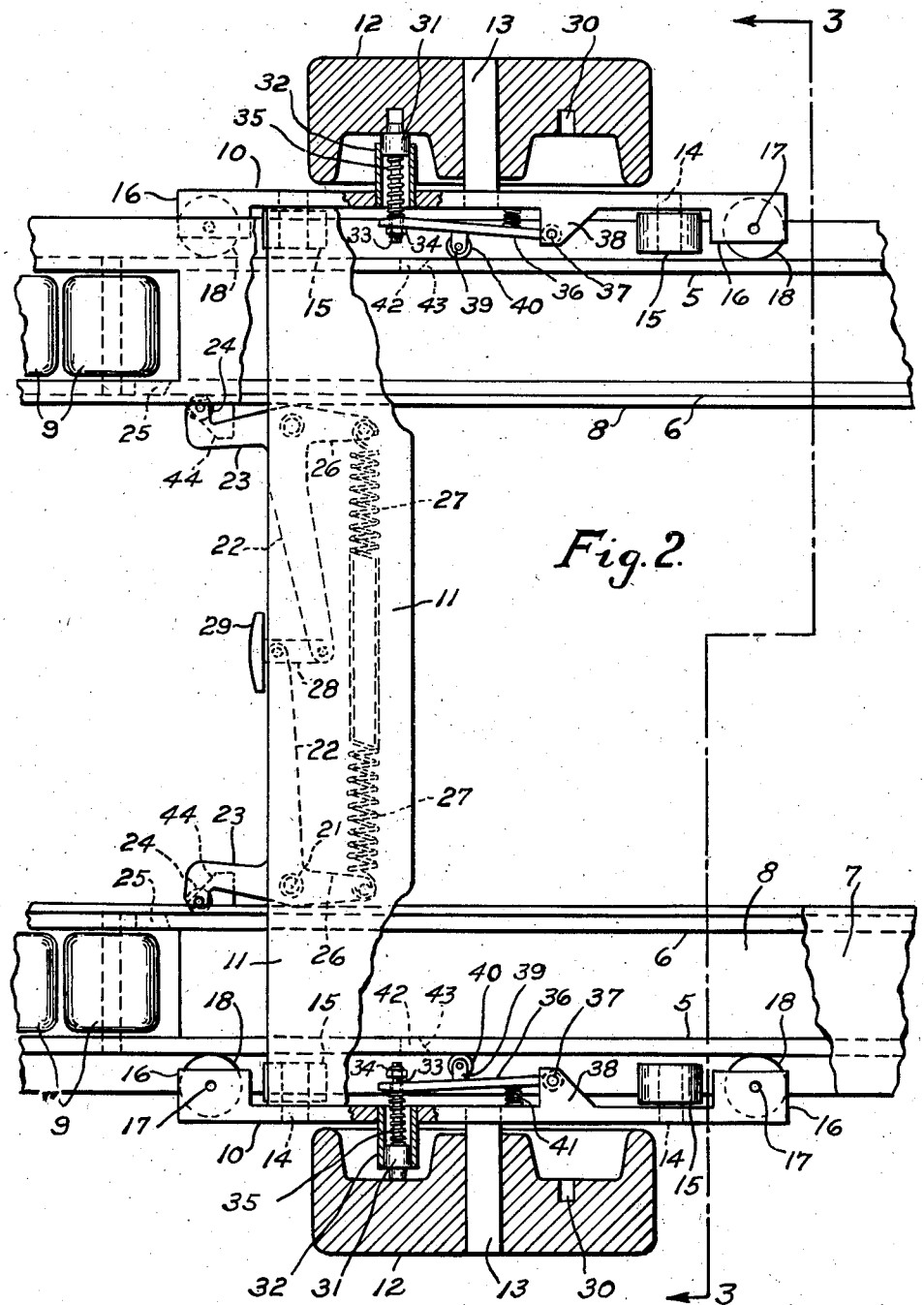

Patented Jan. 29, 1946

2,393,902

UNITED STATES PATENT OFFICE 2,393,902

PORTABLE HOISTING AND TRANSPORTING MACHINE FOR PALLETS AND THE LIKE

Russell Hastings, Jr., Wellesley, Mass., assignor to Lewis-Shepard Company, Watertown, Mass., a corporation of Massachusetts Application July 10, 1944, Serial No. 544,273

10 Claims. (Cl. 214—113)

This invention relates to improvements in machines for lifting and transporting pallets and the like, which are supported at a suitable distance from the floor, having a horizontal base provided at its front end with steering mechanism, and an upright having mounted thereon vertically movable load supporting means overlying the base, and rear wheel mechanism normally locked at a predetermined distance from the upright beneath the weight of the load supporting means and movable longitudinally toward the upright to permit the base to be inserted rearwardly beneath the pallet.

The invention comprises certain improvements upon the construction disclosed in my prior Patent No. 2,258,180 granted October 7, 1941, which discloses manually operable lever mechanism for selectively latching the carriage in transporting position beneath the load supporting means and for releasing the latching means to permit rearward movement of the base relatively to the carriage, and also to actuate means for locking the wheels against rotation upon release of the carriage latching mechanism.

The present invention differs from that disclosed in my prior patent by the provision of means automatically operable upon engagement with the support for the pallet or the pallet itself during rearward movement of the base as it is being inserted rearwardly beneath the pallet to release the carriage latching means and permit uninterrupted continued insertion of the base beneath the pallet and preferably also comprises means for automatically locking the carriage wheels during the movement of the base relatively thereto.

The present invention also comprises means operable upon withdrawal of the base from beneath the pallet support to release the wheel locking means before the carriage latching mechanism is relocked thereby to permit separation of the latch actuating means from the pallet support to permit relatching of the carriage to the base, means also operable by said wheel locking mechanism being provided to insure effective relatching of the carriage to the base in normal transporting position.

These and other objects and features of the invention will more fully appear from the following description and the accompanying drawings and will be particularly pointed out in the claims.

Figure 1:
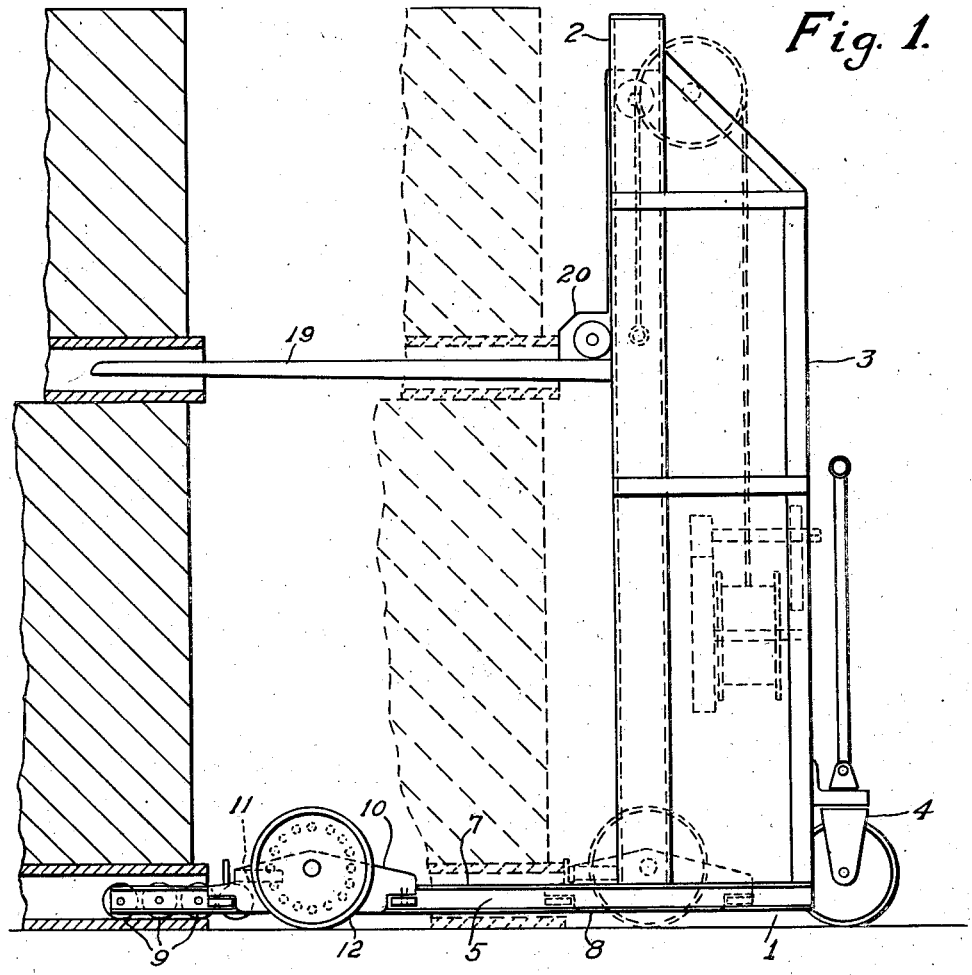
Figure 3:
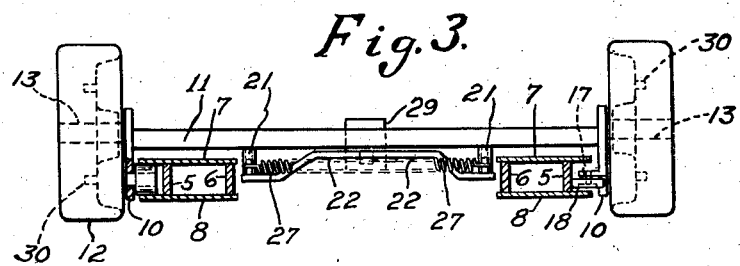

A preferred embodiment of the invention is illustrated in the accompanying drawings, in which, Fig. 1 is a side elevation of a truck embodying the invention illustrating in full lines the rear wheel mechanism in load transporting position entering the pallet supporting means and the load supporting means entering the loaded pallet to be transported and showing in dotted lines the position of the rear wheel mechanism when the base and load supporting means have respectively fully entered the pallet supporting means and the loaded pallet;

Fig. 2 is a detail plan view of the rear end portion of the base, the carriage which is slidably mounted thereon and the mechanism for latching the carriage to the base and for locking the carriage wheels against rotation, the carriage wheels being shown in horizontal section; and, Fig. 3 is a detail transverse sectional view on line 3—3, Fig. 2.

The preferred construction illustrated in the drawings comprises suitably spaced parallel base members 1 of narrow vertical width united at their front ends only by a fabricated frame construction having vertical uprights 2 and vertical standards 3 connected by cross members (not shown) and having suitable steering mechanism 4 mounted upon said frame. The base members desirably are in the form of fabricated box-like construction having spaced vertical girders 5 and 6 having top plates 7 and lower plates 8 welded thereto, the top and bottom plates 7 and 8 terminating short of the rear ends, and a plurality of rollers 9 suitably journaled in the side girders with their peripheries extending below the horizontal plane of the lower plates 8.

The rear wheel mechanism which is slidably mounted upon the base members comprises a carriage having like parallel vertical side frames 10 desirably of somewhat triangular form, as shown in Fig. 1, connected by a bridge preferably in the form of a heavy steel plate 11 which is welded or otherwise fixedly secured to the side frames. Floor-engaging wheels 12 are journaled upon axles 13 which extend outwardly from the central portions of the side frames and the side frames are also provided with inwardly extending shafts 14 having wheels 15 mounted thereon adapted to engage side portions of the plates 7 and 8 which extend beyond the girders 5 and which serve to support the side members during the longitudinal movement thereof relatively to the base. The side frames 10 are likewise provided at their ends with inwardly extending portions forming flanges 16 having vertical shafts 17 upon which are mounted rollers 18 adapted to engage the side of the girders 5 and thereby prevent rocking movement of the carriage during the movement of the base relatively thereto.

Suitable means are provided for normally latching the carriage at a predetermined distance from the front end of the machine beneath the load receiving member 19 of the load supporting means 20 which is vertically movable upon the upright 2 and is raised and lowered by a suitable mechanism well known in the art.

The present invention as heretofore described comprises means for latching the carriage to the base members with means operable upon engagement with the pallet or its support for automatically releasing the latching means to permit continued rearward movement of the base members into the space beneath the pallet and without interruption of the rearward movement of the base members. A particular means for accomplishing this purpose comprises lever mechanism in the form of substantially T-shaped levers 20 which are fulcrumed upon pivots 21 extending downwardly from the bridge plate 11, said levers having inwardly extending arms 22 which overlap at their inner ends, rearwardly extending arms 23 provided with latching rollers 24 adapted respectively to engage shouldered members, preferably in the form of recesses 25, in the inner girders 6, said levers having forwardly extending arms 26 connected by a strong spiral spring 27 acting to force the latch-engaging rollers 24 against the respective girders 6 and to cause the latching rollers to engage the recesses 25 when the carriage is in normal position, the carriage being shown in Fig. 2 of the drawings just forward of latching position. The overlapping inner ends of the lever arms 22 are pivotally connected to the stem 28 of means such as a pad 29 adapted upon rearward movement of the carriage when in locked position to engage the pallet supporting means or the pallet itself during the rearward movement of the hoisting machine as its base is entering the space beneath the pallet.

By reason of this construction engagement of the pad 29 with the pallet support or pallet forces the inner ends of the levers 23 forwardly thus withdrawing the latch receiving rollers from the recesses 25 and thereby permitting continued rearward movement of the base members until the same are fully inserted beneath the pallet. Such release of the latching mechanism occurs before the rear wheels or bridge plate 11 have engaged the pallet support so that no shock is imparted to the operator during the full insertion of the base beneath the pallet.

Means are provided for automatically locking the carriage wheels against rotation immediately following disengagement of the carriage locking means. The preferred mechanism for accomplishing this purpose, which is illustrated more particularly in Fig. 2 of the drawings, comprises a circular series of sockets 30 in the webs of the carriage wheel 12 which are adapted to be engaged by locking bolts having heads 31 which are slidably mounted in suitable bearings 32 extending outwardly from the side frames 10 and which locking bolts are provided with stems or rods 33 having at their inner ends adjustable nuts 34 and surrounded by spiral springs 35 which abut at their outer ends against the heads of the locking bolts and at their inner ends engage the end portion of levers 36 which are fulcrumed upon pivots 37 mounted in upper and lower bosses 38 extending inwardly from the side frames 10. The levers 36 are provided intermediate of their length with inwardly extending bosses 39 in which are journaled rollers 40 adapted to engage the outer girders 5 of the base members and are forced into such engagement by springs 41. The girders 5 are provided with recesses 42 having rearwardly and inwardly inclined front walls 43 adapted to receive the rollers 40, whereupon the springs 41 will force the levers 36 inwardly into engagement with the nuts 34 on the rods 33 thereby relieving the pressure of the springs 35 upon the heads of the locking bolts and then withdrawing the locking bolts from engagement with the sockets 30 in the wheels.

When the rollers 40 of the wheel-locking mechanism are in engagement with the recesses 42 in the girder 5 and the wheels unlocked for transportation of the truck the carriage is latched in normal transporting position by the engagement of the rollers 24 with the recesses 25 in the inner girder 6.

When upon rearward movement of the truck to insert its base beneath the pallet support the pad 29 of the latching mechanism engages the support for the pallet and releases the latching rollers 24 from the recesses 25 rearward movement of the carriage is arrested and upon further rearward movement of the base members the rollers 40 are caused to rise outwardly upon the inclined forward wall 43 of the recess thereby causing the lever 36 to compress the springs 41 and simultaneously to compress the spring 35 thereby forcing the locking bolts into engagement with the sockets 30 in the wheels, if the same is in alinement with the locking bolts, or to cause such engagement upon further slight rotation of the wheels. When the wheels are thus locked the load supporting means, when properly positioned vertically, can be inserted into the pallet to be transported and then raised sufficiently to support the pallet and its load upon the load supporting means. The recesses 25 in the girder 6 and the recesses 42 in the girder 5 are so positioned relatively to each other as to assure that the rollers 40 will enter the recesses 42, thereby withdrawing the locking bolts 31 from the sockets 30 in the wheels, before the pivots 21 engage the stops 44.

When the pallet is thus loaded upon the load supporting means the base members are drawn forwardly, with the wheels of the carriage still locked against rotation, until the rollers 24 of the carriage locking mechanism are about to be forced by the spring 27 into engagement with the recesses 25 in the girders 6 at which time the rollers 40 of the wheel locking mechanism engage the inwardly and rearwardly inclined wall 43 of the recesses 42. A longitudinal resultant rearward force is thus exerted by the inclined wall 42 sufficient to insure locking engagement of the rollers 24 with the recesses 25 by offsetting the forces produced by frictional drag of the rollers 15, 18 and 24 acting upon the base members, which would otherwise tend to move the carriage forwardly and prevent completion of the locking engagement of the rollers 24 with the recesses 25. The inclined surfaces 43 of the walls of the recesses 42 serve also when the latching rollers 24 are unlatched from the recesses 25 upon engagement of the pad 29 of the pallet support to displace the rollers 40 of the wheel locking mechanism outwardly into engagement with the outer side of the outside girder 5, thereby compressing the springs 35 of the locking bolt mechanism when the carriage is located at any position relative to the base during its forward or backward movement other than at the normal transporting position at which the carriage is locked as aforesaid at a predetermined distance from the upright.

Desirably means are provided for limiting the forward and rearward movement of the carriage relatively to the base members. This is accomplished in the present invention by engagement of the bridge member 11 with the uprights 2 upon forward movement of the carriage and the rearward movement of the carriage relative to the base is arrested by engagement of the pivots 21 with suitable stops 44 mounted upon and extending inwardly from the girders 6.

By reason of the present invention therefore the relative movements of the base and carriage are automatically controlled. When the operator backs the truck into loading position engagement of the pad 29 with the pallet support automatically unlatches the carriage and thereupon locks the carriage wheels against rotation, thus permitting further rearward movement of the base beneath the pallet support to loading position. When the loaded pallet is raised by the upward movement of the load supporting means to transporting position forward movement of the base relatively to the carriage will cause unlocking of the carriage wheels and relatching of the carriage in transporting position. By reason of this construction therefore the operator has merely to push the truck to loading position, operate the load supporting mechanism to raise the loaded pallet, and then to draw the truck to its destination without the necessity of manipulating levers or the like which control the carriage latching and releasing mechanism.

The present construction therefore results in the saving of time by the operator and insures properly timed sequence of the carriage latching and wheel locking operations.

It will be understood that the particular embodiment of the invention shown and described herein is of an illustrative character and that various modifications in construction and arrangement of parts may be made within the spirit and scope of the following claims.

Having thus described the invention, what is claimed as new, and desired to be secured by Letters Patent, is:

1. A portable hoisting machine, having a horizontal base provided at its front end with steering mechanism and an upright having mounted thereon vertically movable load supporting means overlying said base, and rear wheel mechanism movable longitudinally of said base to permit said base to be inserted rearwardly therebeyond beneath a support for the articles suitably spaced from the floor and resilient means normally locking the rear wheel mechanism at a predetermined distance from said upright beneath the load supporting means, means for releasing said rear wheel mechanism comprising a member adapted to engage the article-supporting means as the base is being inserted therebeneath, and means automatically operable thereby to disengage said locking means to permit full rearward insertion of the base beneath the article-supporting means and to permit automatic relocking of the rear wheel mechanism in normal position upon forward movement of said base relatively to said rear wheel mechanism.

2. A portable hoisting machine, having a horizontal base provided at its front end with steering mechanism and an upright having mounted thereon vertically movable load supporting means overlying said base and rear wheel mechanism movable longitudinally of said base to permit said base to be inserted rearwardly therebeyond beneath a support for the articles suitably spaced from the floor and resilient means normally locking the rear wheel mechanism at a predetermined distance from said upright beneath the load supporting means, means for releasing said rear wheel mechanism comprising a member adapted to engage the article-supporting means as the base is being inserted therebeneath, and means automatically operable thereby to disengage said locking means to permit full rearward insertion of the base beneath the article-supporting means and to permit automatic relocking of the rear wheel mechanism in normal position upon forward movement of said base relatively to said rear wheel mechanism, and means for automatically preventing rotation of the rear wheels during the release of the rear locking mechanism but operable upon forward movement of the base when the rear wheel mechanism is relocked in normal position to permit rotation of said rear wheels.

3. A portable hoisting machine having a horizontal base provided at its front end with steering wheel mechanism and an upright having mounted thereon vertically movable load supporting means overlying said base, a carriage provided with floor-engaging wheels slidably mounted on said base to permit said base to be inserted rearwardly therebeyond beneath a support for the articles suitably spaced from the floor, a spring actuated lever mechanism normally locking the rear wheel mechanism at a predetermined distance from said upright comprising lever-actuating means on said carriage adapted to engage the article-supporting means as the base is being inserted therebeneath and automatically operable thereby to cause said spring actuated lever mechanism to release said locking means and permit full rearward insertion of the base beneath the article-supporting means but to permit relocking of said rear wheels in normal position upon forward movement of said base relatively to said rear wheel mechanism.

4. A portable hoisting machine having a horizontal base provided at its front end with steering wheel mechanism and an upright having mounted thereon vertically movable load supporting means overlying said base, a carriage provided with floor-engaging wheels slidably mounted on said base to permit said base to be inserted rearwardly therebeyond beneath a support for the articles suitably spaced from the floor, a spring actuated lever mechanism normally locking the rear wheel mechanism at a predetermined distance from said upright comprising lever-actuating means on said carriage adapted to engage the article-supporting means as the base is being inserted therebeneath and automatically operable thereby to cause said spring actuated lever mechanism to release said locking means and permit full rearward insertion of the base beneath the article-supporting means but to permit relocking of said rear wheels in normal position upon forward movement of said base relatively to said rear wheel mechanism, spring actuated locking mechanism for preventing rotation of the wheels of said rear wheel mechanism during the release of the means for locking the rear wheel mechanism to the base, and means automatically operable upon forward movement of the base relatively to the rear wheel mechanism to relocking position to disengage the means for locking the rear wheels against rotation.

5. A portable hoisting machine, for a pallet supported at a suitable distance from the floor, having a frame of horizontal spaced base members rigidly connected at their front ends and provided with front steering mechanism and adjacent said front end with an upright having vertically movable load supporting members extending rearwardly over said base members, a carriage slidably mounted on said base members having side frames with floor-engaging wheels mounted thereon, complementary spring actuaed levers pivotally mounted on said carriage having inwardly extending arms and laterally extending arms having latching means slidably engaging the respective base members and adapted to engage complementary cooperating shoulder means on said base members so positioned as to retain said carriage at a suitable distance from said upright and beneath said load supporting means, and lever actuating means mounted on the carriage engaging the inwardly extending arms of said levers adapted to abut the end of the pallet or its support as the base members are inserted therebeneath thereby to arrest said carriage and to release the latches of said levers and permit further rearward movement of the base relatively to said carriage.

6. A portable hoisting machine, for a pallet supported at a suitable distance from the floor, having a frame of horizontal spaced base members rigidly connected at their front ends and provided with front steering mechanism and adjacent said front end with an upright having vertically movable load supporting members extending rearwardly over said base members, a carriage slidably mounted on said base members having side frames with floor-engaging wheels mounted thereon, provided with a concentric series of lock-receiving sockets, complementary spring actuated levers pivotally mounted on said carriage having inwardly extending arms and laterally extending arms having latching means slidably engaging the respective base members and adapted to engage complementary cooperating shoulder means on said base members so positioned as to retain said carriage at a suitable distance from said upright and beneath said load supporting means, and lever actuating means mounted on the carriage engaging the inwardly extending arms of said levers adapted to abut the end of the pallet or its support as the base members are inserted therebeneath thereby to arrest said carriage and to release the latches of said levers and permit further rearward movement of the base relatively to said carriage, spring actuated wheel-locking bolts mounted in the respective side frames of the carriage adapted to engage sockets in the respective wheels and stop the rotation thereof when the carriage is released from said base members, and means operable during the forward movement of the base relatively to said carriage when the carriage is relocked to the base automatically to withdraw said locking bolts from said wheels and thereby permit rotation of said wheels during forward movement of the truck.

7. A portable hoisting machine, for a pallet supported at a suitable distance from the floor, having a frame of horizontal spaced base members rigidly connected at their front ends and provided with front steering mechanism and adjacent said front end with an upright having vertically movable load supporting members extending rearwardly over said base members, a carriage slidably mounted on said base members having side frames with floor-engaging wheels mounted thereon, complementary levers pivotally mounted on said carriage having inwardly extending arms provided with latching rollers slidably engaging said base members and having oppositely extending lateral arms connected by a spring normally holding said latching members slidably in engagement with the respective base members, said base members having complementary recesses so positioned as when engaged by said latching rollers to retain the carriage at a suitable distance from the upright and beneath the load supporting means, and lever actuating means mounted on said carriage engaging the inwardly extending arms of the levers adapted to abut the end of the pallet or its support as the base members are inserted therebeneath thereby thereby to arrest said carriage and to cause said levers to release the latching rollers from the respective recesses thereby to permit further rearward movement of the base members relatively to said carriage.

8. A portable hoisting machine for a pallet or the like, supported at a suitable distance from the floor, having a horizontal base provided at its front end with steering mechanism and an upright having mounted thereon vertically movable load supporting means overlying said base, a carriage slidably mounted on said base having floor-engaging wheels, spring actuated lever mechanism mounted on said carriage having latching rollers resiliently engaging said base and provided with means adapted upon engagement with the pallet or its support during the rearward movement of the base automatically to withdraw said latching rollers from effective engagement with said base, and coordinated spring actuated wheel-locking means mounted on said carriage having rollers resiliently engaging said base, said base having recesses so positioned as normally to receive said latching rollers and lock the carriage at a distance from the steering mechanism beneath the load supporting means, and complementary inclined recesses so positioned as to displace the rollers of the wheel-locking means upon initial rearward movement of the base after release of the carriage-locking means and to lock the carriage wheels against rotation during the movement of the base relatively to the carriage.

9. A portable hoisting machine for a pallet or the like, supported at a suitable distance from the floor, having a horizontal base provided at its front end with steering mechanism and an upright having mounted thereon vertically movable load supporting means overlying said base, a carriage slidably mounted on said base having floor-engaging wheels, spring actuated lever mechanism mounted on said carriage having latching rollers resiliently engaging said base and provided with means adapted upon engagement with the pallet or its support during the rearward movement of the base automatically to withdraw said latching rollers from effective engagement with said base, and coordinated spring actuated wheel-locking means mounted on said carriage having rollers resiliently engaging said base, said base having recesses so positioned as normally to receive said latching rollers and lock the carriage at a distance from the steering mechanism beneath the load supporting means, and complementary inclined recesses so positioned as to displace the rollers of the wheel-locking means upon initial rearward movement of the base after release of the carriage-locking means and to lock the carriage wheels against rotation during movement of the base relatively to the carriage, and conversely at the final forward movement of the base to first release said wheel-locking means to permit separation of the latching means from the pallet support which in turn permits reengagement of the carriage-latching means.

10. A portable hoisting machine for a pallet or the like, supported at a suitable distance from the floor, having a horizontal base provided at its front end with steering mechanism and an upright having mounted thereon vertically movable load supporting means overlying said base, a carriage slidably mounted on said base having floor-engaging wheels, spring actuated lever mechanism mounted on said carriage having latching rollers resiliently engaging said base and provided with means adapted upon engagement with the pallet or its support during the rearward movement of the base automatically to withdraw said latching rollers from effective engagement with said base, and coordinated spring actuated wheel-locking means mounted on said carriage having rollers resiliently engaging said base, said base having recesses so positioned as normally to receive said latching rollers and lock the carriage at a distance from the steering mechanism beneath the load supporting means, and complementary inclined recesses so positioned as to displace the rollers of the wheel-locking means upon initial rearward movement of the base after release of the carriage-locking means and to lock the carriage wheels against rotation during movement of the base relatively to the carriage, and conversely at the final forward movement of the base to first release said wheel-locking means to permit separation of the latching means from the pallet support which in turn permits reengagement of the carriage-latching means, said base members having inwardly and rearwardly inclined walls leading to the wheel-locking recess adapted upon engagement of the co-acting rollers therewith to exert such longitudinal force on said carriage as to assure complete engagement of the carriage-locking latches with their complementary recesses in the base.

RUSSELL HASTINGS, Jr.